(12) United States Patent
Dai et al.

(10) Patent No.: US 10,189,981 B2
(45) Date of Patent: Jan. 29, 2019

(54) HIGH-STRENGTH CROSS-LINKED POLYMER PHOTONIC CRYSTAL FILM

(71) Applicant: XIAMEN UNIVERSITY, Xiamen (CN)

(72) Inventors: Lizong Dai, Xiamen (CN); Shirong Yu, Xiamen (CN); Conghui Yuan, Xiamen (CN); Long Zhang, Xiamen (CN); Lina Zhong, Xiamen (CN); Cunfeng Song, Xiamen (CN); Yiting Xu, Xiamen (CN); Birong Zeng, Xiamen (CN); Wei'ang Luo, Xiamen (CN)

(73) Assignee: XIAMEN UNIVERSITY, Xiamen (CN)

( * ) Notice: Subject to any disclaimer, the term of this patent is extended or adjusted under 35 U.S.C. 154(b) by 273 days.

(21) Appl. No.: 14/911,953

(22) PCT Filed: Aug. 13, 2014

(86) PCT No.: PCT/CN2014/084282
§ 371 (c)(1),
(2) Date: Feb. 12, 2016

(87) PCT Pub. No.: WO2015/021920
PCT Pub. Date: Feb. 19, 2015

(65) Prior Publication Data
US 2016/0194490 A1    Jul. 7, 2016

(30) Foreign Application Priority Data

Aug. 13, 2013 (CN) .......................... 2013 1 0351466

(51) Int. Cl.
| | | |
|---|---|---|
| *C08L 25/14* | (2006.01) | |
| *C08J 3/24* | (2006.01) | |
| *C08F 212/08* | (2006.01) | |
| *C08F 220/06* | (2006.01) | |
| *C08F 220/32* | (2006.01) | |
| *C08J 5/18* | (2006.01) | |
| *C08L 25/08* | (2006.01) | |
| *C09D 125/14* | (2006.01) | |

(52) U.S. Cl.
CPC ............ *C08L 25/14* (2013.01); *C08F 212/08* (2013.01); *C08F 220/06* (2013.01); *C08F 220/32* (2013.01); *C08J 3/24* (2013.01); *C08J 5/18* (2013.01); *C08L 25/08* (2013.01); *C09D 125/14* (2013.01); *C08J 2325/08* (2013.01); *C08J 2325/14* (2013.01)

(58) Field of Classification Search
CPC ......................................................... C08J 3/24
See application file for complete search history.

(56) References Cited

U.S. PATENT DOCUMENTS

2011/0250453 A1* 10/2011 Leyrer .................. B82Y 20/00
428/402

FOREIGN PATENT DOCUMENTS

CN          103409802 A    * 11/2013

OTHER PUBLICATIONS

Machine translation of CN 103409802 A, published Nov. 23, 2013. (Year: 2013).*

* cited by examiner

*Primary Examiner* — Vickey Nerangis
(74) *Attorney, Agent, or Firm* — Rabin & Berdo, P.C.

(57) ABSTRACT

The present invention provides a method for preparing high-strength cross-linked polymer photonic crystal film by core-shell polymer microspheres via evaporation-induced self assembly. Monodispersed core-shell polymer microspheres are fabricated by emulsifier-free emulsion polymerization, and then the microspheres emulsion is coated onto suitable substrates. Finally, polymer photonic crystal film with long-range ordered is constructed via self assembly. Self-cross-linking between the two units improves the strength of the polymer photonic crystal film, therefore the preparation of large size industrial-grade photonic crystal film is practicable which extends its application on the field of dyeing.

6 Claims, 2 Drawing Sheets

HIGH-STRENGTH CROSS-LINKED POLYMER PHOTONIC CRYSTAL FILM

FIELD OF THE INVENTION

The present invention relates to colloid photonic crystal film, and especially to high-strength cross-linked polymer photonic crystal film fabricated by evaporation-induced self assembly.

BACKGROUND OF THE INVENTION

Yab Ionovit (Yablonovitch, E. et al. Phys. Rev. Lett. 1987, 58, 2059-2062.) and John (John, S. et al. Phys. Rev. Lett. 1987, 58, 2486-2489) presented the concept of photonic crystal in 1987. Bragg diffraction occurs at the dielectric interface of photonic crystal as a result of great disparity between potential field and dielectric constant and leads to photonic band gap capable of spreading and dispersing light, and therefore new physical phenomenon such as superprism phenomenon or negative refraction index dielectric effect is observed. For the next thirty years, photonic crystal has been attracted extensive attention and the method of preparation has been widely investigated. As advanced optical material, photonic crystal shows promising prospect of application on photonic crystal reflective device, photonic crystal filter, LED and photonic crystal fiber and becomes an important material to produce photonic device.

Velev (O. D. Velev, et al. Science, 2000, 287, 2240-2243.) added high concentration of PS nanospheres aqueous solution into fluorinated oil phase. As polymer droplet floats on the oil phase, PS nanospheres arrange regularly and micron scale photonic crystal microspheres are formed after water evaporation. Different colors and shapes of microspheres are obtained by adjusting the grain size of PS nanospheres and its concentration.

Velikov (K. P. Velikov, et al. Science, 2002, 296, 206-109.) produced binary superlattice by layer to layer self-assembly via PS nanospheres with different grain sizes as self-assembled unit.

Wang (J. Wang, et al. Macromol. Chem. Phys. 2006, 207, 596-604.) synthesized a series of core-shell nanospheres of different grain sizes with PS as core and PMMA as shell, and discovered that the polymer nanospheres could be stacked on matrix to form photonic crystal with long-range ordered. Further, color change of photonic crystal from red to blue can be realized by adjusting the grain sizes of polymer nanospheres.

Mihi (A. Mihi, et al. Adv. Mater. 2006, 18, 2244-2249.) dispersed $SiO_2$ or sulfonated polystyrene nanospheres on volatile solvent and produces photonic crystal with color of being adjustable via spin coating.

Patent No. CN200510012021.6 disclosed a polymer colloid photonic crystal film with photonic band gap on UV-light by polymer emulsoid particle with hard core and soft shell. However, the polymer emulsoid particle is produced by three monomers with complicated feeding and temperature programming. Moreover, the final product is not pure enough as emulsifier and pH buffer are introduced into the system and the formation of colloid crystal is disturbed by impurity, which may limit the size of final film and its application. The polymer emulsoid particles are stacked together without chemical bonding, so that its mechanical strength is less than that of high-strength cross-linked polymer photonic crystal film of present invention.

Ordered arrangement of photonic crystal can be realized by self assembly since van der Waals force, hydrogen bond, electrostatic force and surface tension can be considered as its dynamics. The present invention provides a simple and efficient method for preparing high-strength cross-linked polymer photonic crystal film based on self assembly.

SUMMARY OF THE INVENTION

One objective of the present invention is to provide a simple method for preparing high-strength cross-linked polymer photonic crystal film by monodispersed polymer microspheres modified with different functional groups. The process is simple and practicable which can be implemented under normal temperature and pressure, and the resulting high-strength cross-linked polymer photonic crystal film shows different colors and high mechanical property.

The method comprises the steps of:

1. dispersing different sorts of monodispersed polymer microspheres into water under normal temperature and pressure respectively to obtain different sorts of polymer microspheres emulsions with different concentrations ranging from 5 wt % to 30 wt %;

2. defining polymer microspheres with epoxy groups on the surface of step 1 as first self-assembled unit and polymer microspheres with carboxyl groups or amino groups on the surface of step 1 as second self-assembled unit, coating first self-assembled unit and second self-assembled unit onto flat substrates successively under normal temperature and pressure, and forming polymer photonic crystal film with long-range ordered by self-assembly of the polymer microspheres after water evaporation, wherein epoxy groups of first self-assembled unit reacts with carboxyl groups or amino groups of second self-assembled unit and self-cross-linking between two units improves the strength of the polymer photonic crystal film.

The variations in color of crystal film is achieved by adjusting the proportion of first self-assembled unit and second self-assembled unit, grain size of microspheres and arrangement of microspheres.

Another objective of the present invention is to provide a method for preparing monodispersed core-shell polymer microspheres modified with different functional groups. The core-shell polymer microspheres are one-step synthetized by emulsifier-free emulsion polymerization which is simple and practicable, and the resulting polymer microspheres of uniform grain size are pure without surfactant or stabilizer. Polymer microspheres is capable of being stacked closely and arranged regularly, therefore polymer photonic crystal with different colors can be produced and applied to coating, paint and film.

The method comprises the steps of:

adding hydrophilic monomer and hydrophobic monomer into aqueous solvent under stirring with a speed of 200 to 600 rpm for uniform mixing, adding an initiator solution and reacting for 10 to 26 hours at the temperature of 65° C. to 85° C. under the protection of nitrogen atmosphere to obtain monodispersed polymer microspheres with grain size ranging from 100 nm to 2 µm; wherein the dosage of hydrophilic monomer and hydrophobic monomer is 1 wt % to 20 wt % of total mass of hydrophilic monomer, hydrophobic monomer, water and initiator solution, and the dosage of initiator is 0.1 wt % to 5 wt % of total mass of hydrophilic monomer and hydrophobic monomer; wherein the volume ratio between hydrophilic monomer and hydrophobic monomer is $1/10$ to $1/3$.

In a preferred embodiment, the hydrophilic monomer is one of glycidyl methacrylate, 2-hydroxyethyl methacrylate, N-isopropyl acrylamide, acrylamide or acrylic acid.

In a preferred embodiment, the hydrophobic monomer is styrene.

In a preferred embodiment, the initiator is potassium persulphate and the concentration of the initiator aqueous solution is from 0.2 wt % to 2 wt %.

The monodispersed core-shell polymer microspheres are one-step synthesized by emulsifier-free emulsion polymerization which is simple and practicable, and the grain sizes and shapes of resulting polymer microspheres are adjustable. Moreover, the resulting polymer micro sphere is pure without surfactant or stabilizer, which can be used to prepare polymer photonic crystal without any other pretreatment. Two monomers used in emulsifier-free emulsion polymerization are hydrophilic monomer and hydrophobic monomer. During the polymerization, hydrophilic monomer tends to migrate to aqueous solution system so that the shell is generated, while hydrophobic monomer tends to migrate to inside of the shell and generates the core. Therefore monodispersed core-shell polymer microsphere is formed under stirring. The grain size of microsphere is adjustable by changing proportion of hydrophilic monomer and hydrophobic monomer, temperature, stirring speed, or dosage and concentration of initiator.

The method for preparing high-strength cross-linked polymer photonic crystal film is dispersing different sorts of monodispersed polymer microspheres into water, coating onto flat substrates and forming regular-stacked polymer photonic crystal film after water evaporation by self-assembly. The variation in the color of crystal film is achieved by adjusting the proportion of first self-assembled unit and second self-assembled unit, and the grain size of microspheres as well as the arrangement of microspheres. The thickness of film depends on the concentration and dosage of polymer microspheres emulsions. Since the polymer microspheres mentioned above is monodispersed, they are capable of being stacked closely and arranged regularly during self assembly. The self-cross-linking between the two units improves the strength of the polymer photonic crystal film.

The high-strength cross-linked polymer photonic crystal film is capable of being applied to coating, paint, film and solar collector due to its special structure, super optical performance and high strength, and especially superiority in environment protecting field since polymer microspheres are pure and monodispersed. Further, the preparation of large size industrial-grade photonic crystal film is practicable as a result of cross-linking among polymer microspheres, which extends its application on the field of dyeing.

DETAILED DESCRIPTION OF THE EMBODIMENTS

Figure 1:
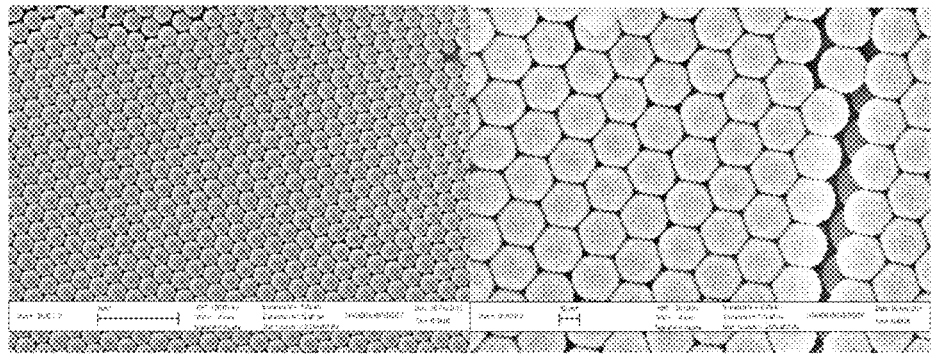
FIG. 1 illustrates SEM images of monodispersed core-shell PS-PAA micro spheres of the present invention.
Figure 2:
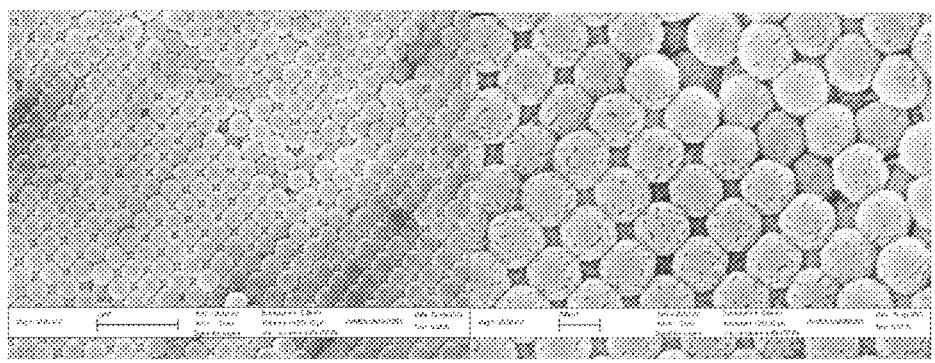
FIG. 2 illustrates SEM images of monodispersed core-shell PS-PAM microspheres of the present invention.
Figure 3:
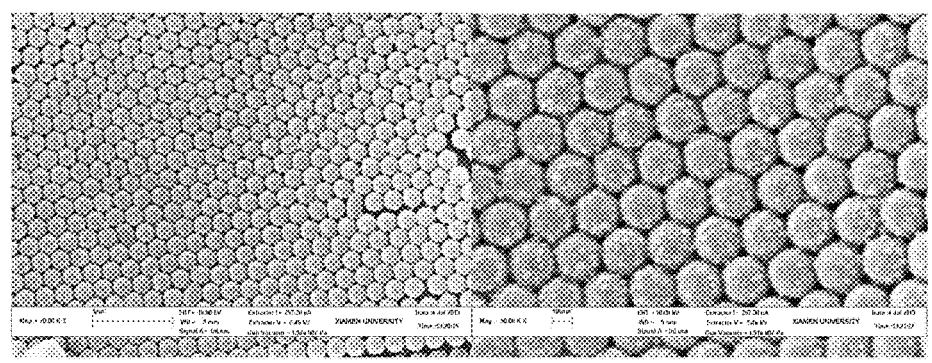
FIG. 3 illustrates SEM images of monodispersed core-shell PS-PGMA microspheres of the present invention.
Figure 4:
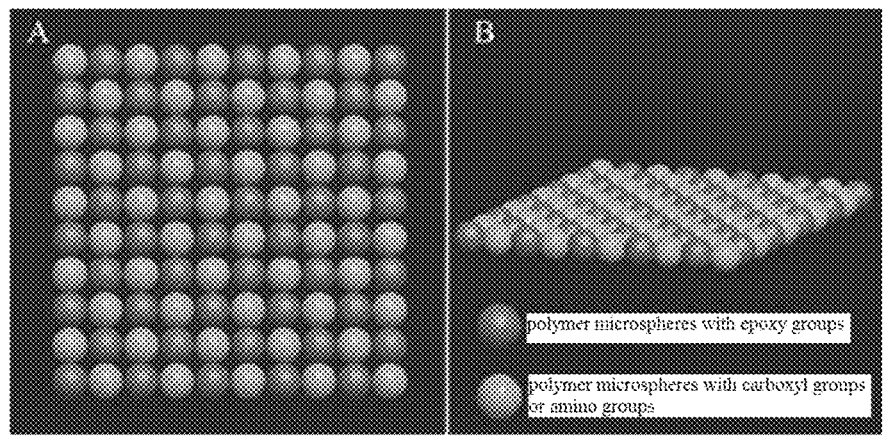
FIG. 4 illustrates two-dimensional mimetic diagrams of polymer photonic crystal constructed by two-component polymer microspheres of the present invention, wherein A refers to an elevation view and B refers to a sectional view.
Figure 5:
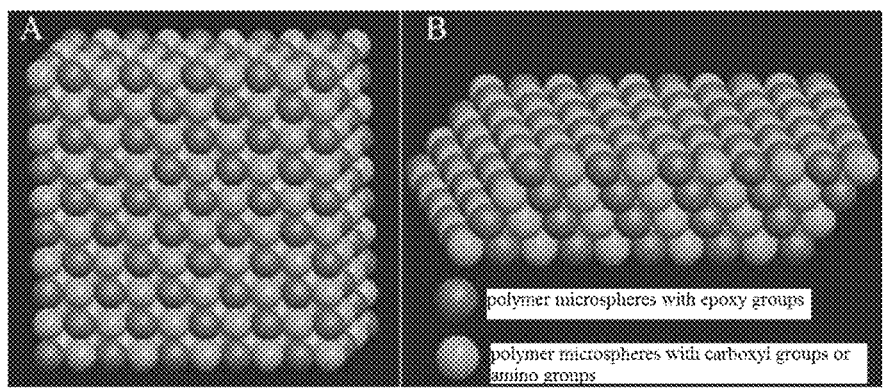
FIG. 5 illustrates three-dimensional mimetic diagrams of polymer photonic crystal constructed by two-component polymer microspheres of the present invention, wherein A refers to an elevation view and B refers to a sectional view.

The present invention will be further described with the drawings and the embodiments.

Embodiment 1

0.6 mL hydrophilic monomer of acrylic acid and 2 mL hydrophobic monomer of styrene are added into a flask with 40 mL deionized water and stirred for 10 min in nitrogen atmosphere, and then 0.08 g initiator of potassium persulphate aqueous solution is added. The reaction system is heated to 80° C. and reacted for 12 hours in nitrogen atmosphere to obtain monodispersed styrene-acrylic acid copolymer (PS-PAA) microspheres emulsion.

0.8 mL hydrophilic monomer of glycidyl methacrylate and 2 mL hydrophobic monomer of styrene are added into a flask with 40 mL deionized water and stirred for 10 min in nitrogen atmosphere, and then 0.08 g initiator of potassium persulphate aqueous solution is added. The reaction system is heated to 80° C. and reacted for 12 hours in nitrogen atmosphere to obtain monodispersed styrene-acrylamide copolymer (PS-PGMA) microspheres emulsion.

PS-PGMA microspheres with epoxy groups on the surface defined as first self-assembled unit and PS-PAA microspheres with carboxyl groups on the surface defined as second self-assembled unit are coated onto flat substrates successively under normal temperature and pressure, and then high-strength cross-linked polymer photonic crystal film with long-range ordered by self assembly of the polymer microspheres after water evaporation is obtained, wherein epoxy groups of the first self-assembled unit reacts with carboxyl groups of the second self-assembled unit and the self cross-linking between the two units is realized.

Embodiment 2 to 6

The method for preparing high-strength cross-linked polymer photonic crystal film of embodiment 2 to 6 is similar to embodiment 1. Monodispersed PS-PAA microspheres emulsion with different grain sizes are synthesized by changing the dosage of acrylic acid and the results are presented on sheet 1. Monodispersed PS-PGMA microspheres emulsion with different grain sizes are synthesized by changing the dosage of glycidyl methacrylate and the results are presented on sheet 2.

PS-PGMA microspheres with epoxy groups on the surface defined as first self-assembled unit and PS-PAA microspheres with carboxyl groups on the surface defined as second self-assembled unit of embodiment 2 to 6 are coated onto flat substrates successively under normal temperature, and then high-strength cross-linked polymer photonic crystal film with long-range ordered by self assembly of the polymer microspheres after water evaporation is obtained, wherein epoxy groups of the first self-assembled unit reacts with carboxyl groups of the second self-assembled unit and the self cross-linking between the two units is realized.

| | | | | | Sheet 1 | |
|---|---|---|---|---|---|---|
| Embodiment | Acrylic Acid/ mL | Styrene/ mL | Water/ mL | Temp./ ° C. | Potassium persulphate/g + water/mL | Time/ h |
| 2 | 0.10 | 2 | 40 | 80 | 0.08 + 10 | 12 |
| 3 | 0.30 | 2 | 40 | 80 | 0.08 + 10 | 12 |

-continued

Sheet 1

| Embodiment | Acrylic Acid/ mL | Styrene/ mL | Water/ mL | Temp./ °C. | Potassium persulphate/g + water/mL | Time/ h |
|---|---|---|---|---|---|---|
| 4 | 0.50 | 2 | 40 | 80 | 0.08 + 10 | 12 |
| 5 | 0.70 | 2 | 40 | 80 | 0.08 + 10 | 12 |
| 6 | 0.90 | 2 | 40 | 80 | 0.08 + 10 | 12 |

Sheet 2

| Embodiment | Glycidyl methacrylate/ mL | Styrene/ mL | Water/ mL | Temp./ °C. | Potassium persulphate/ g + water/mL | Time/ h |
|---|---|---|---|---|---|---|
| 2 | 0.10 | 2 | 40 | 80 | 0.08 + 10 | 12 |
| 3 | 0.30 | 2 | 40 | 80 | 0.08 + 10 | 12 |
| 4 | 0.50 | 2 | 40 | 80 | 0.08 + 10 | 12 |
| 5 | 0.70 | 2 | 40 | 80 | 0.08 + 10 | 12 |
| 6 | 0.90 | 2 | 40 | 80 | 0.08 + 10 | 12 |

Although the present invention has been described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

INDUSTRIAL APPLICABILITY

The preparation of large size industrial-grade photonic crystal film is practicable as a result of cross-linking among polymer microspheres, which extends its application on the filed of dyeing.

What is claimed is:

1. A method for preparing a cross-linked polymer photonic crystal film, comprising the steps of:
   (a) preparing a first emulsion by:
      polymerizing a hydrophobic monomer and a hydrophilic monomer having epoxy groups in water to provide a first self-assembled unit of monodispersed polymer microspheres having a hydrophobic core and a hydrophilic shell with surface epoxy groups; and
      dispersing the monodispersed polymer microspheres of the first self-assembled unit into water under normal conditions of temperature and pressure to obtain the first emulsion having a concentration of polymer microspheres ranging from 5 wt % to 30 wt %;
   (b) preparing a second emulsion by:
      polymerizing a hydrophobic monomer and a hydrophilic monomer having carboxyl groups or amino groups in water to provide a second self-assembled unit of monodispersed polymer microspheres having a hydrophobic core and a hydrophilic shell with surface carboxyl groups or surface amino groups; and
      dispersing the monodispersed polymer microspheres of the second self-assembled unit into water under normal conditions of temperature and pressure to obtain a second emulsion having a concentration of polymer microspheres ranging from 5 wt % to 30 wt %;
   (c) successively coating the first emulsion and the second emulsion onto a flat substrate in any order; and
   (d) evaporating the water to enable a self-crosslinking reaction between the surface epoxy groups of the first self-assembled unit and the surface carboxyl groups or the surface amino groups of the second self-assembled unit to form said cross-linked polymer photonic crystal film.

2. The method according to claim 1,
   wherein polymerizing to prepare the first emulsion in step (a) includes
      adding the hydrophilic monomer having epoxy groups and the hydrophobic monomer at a volume ratio ranging from 1/10 to 1/3 and at a concentration of hydrophilic monomer and hydrophobic monomer ranging from 1 wt % to 20 wt %, based on total mass of the hydrophilic monomer, hydrophobic monomer, water and an aqueous solution of an initiator, into water with stirring at a speed of 200 to 600 rpm for uniform mixing to obtain a first mixture of monomers, and
      adding the aqueous solution of an initiator having a concentration of 0.1 wt % to 5 wt % of the initiator, based on total mass of the hydrophilic monomer and the hydrophobic monomer, to the first mixture of monomers, and reacting for 10 to 26 hours at a temperature ranging from 65° C. to 85° C. under a nitrogen atmosphere to obtain the first self-assembled unit of monodispersed polymer microspheres having a grain size ranging from 100 nm to 2 µm; and
   wherein polymerizing to prepare the second emulsion in step (b) includes
      adding the hydrophilic monomer having surface carboxyl groups or surface amino groups and the hydrophobic monomer at a volume ratio ranging from 1/10 to 1/3 and at a concentration of hydrophilic monomer and hydrophobic monomer ranging from 1 wt % to 20 wt %, based on total mass of the hydrophilic monomer, hydrophobic monomer, water and an aqueous solution of an initiator, into water with stirring at a speed of 200 to 600 rpm for uniform mixing to obtain a second mixture of monomers, and
      adding the aqueous solution of an initiator having a concentration of 0.1 wt % to 5 wt % of the initiator, based on total mass of the hydrophilic monomer and the hydrophobic monomer, to the second mixture of monomers, and reacting for 10 to 26 hours at a temperature ranging from 65° C. to 85° C. under a nitrogen atmosphere to obtain the second self-assembled unit of monodispersed polymer microspheres having a grain size ranging from 100 nm to 2 µm.

3. The method according to claim 2, wherein the hydrophilic monomer of the first emulsion or the second emulsion is selected from the group consisting of glycidyl methacrylate, 2-hydroxyethyl methacrylate, N-isopropyl acrylamide, acrylamide or acrylic acid.

4. The method according to claim 2, wherein the hydrophobic monomer of the first emulsion or the second emulsion is styrene.

5. The method according to claim 2, wherein the initiator is potassium persulphate and the concentration of the aqueous solution of the initiator ranges from 0.2 wt % to 2 wt %.

6. The method according to claim 2, wherein:
preparing the second emulsion in step (b) includes
- adding 0.6 mL of acrylic acid as the hydrophilic monomer and 2 mL of styrene as the hydrophobic monomer into a flask with 40 mL of deionized water and stirring for 10 min in a nitrogen atmosphere, and
- adding 0.08 g of an aqueous solution of potassium persulphate as the aqueous solution of the initiator,
- heating to 80° C., and
- reacting for 12 hours in a nitrogen atmosphere to obtain the second emulsion comprising a monodispersed polymer microspheres of styrene-acrylic acid copolymer (PS-PAA) with surface carboxyl groups; and preparing the first emulsion in step (a) includes
- adding 0.8 mL of glycidyl methacrylate as the hydrophilic monomer and 2 mL of styrene as the hydrophobic monomer into a flask with 40 mL of deionized water,
- stirring for 10 min in a nitrogen atmosphere;
- adding 0.08 g of an aqueous solution of potassium persulphate as the aqueous solution of the initiator,
- heating to 80° C., and
- reacting for 12 hours in a nitrogen atmosphere to obtain the first emulsion comprising a monodispersed polymer microspheres of styrene-acrylamide copolymer (PS-PGMA) with surface epoxy groups.

* * * * *